(12) United States Patent
Suzuki et al.

(10) Patent No.: US 11,240,237 B2
(45) Date of Patent: Feb. 1, 2022

(54) COMMUNICATION DEVICE, METHOD OF CONTROLLING COMMUNICATION DEVICE, AND COMPUTER-READABLE NON-TRANSITORY STORAGE MEDIUM STORING PROGRAM

(71) Applicant: Toyota Jidosha Kabushiki Kaisha, Toyota (JP)

(72) Inventors: Koichi Suzuki, Miyoshi (JP); Katsunori Takami, Tachikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 16/226,988

(22) Filed: Dec. 20, 2018

(65) Prior Publication Data

US 2019/0199721 A1    Jun. 27, 2019

(30) Foreign Application Priority Data

Dec. 26, 2017    (JP) .............................. JP2017-249591

(51) Int. Cl.
*H04L 29/06* (2006.01)
*H04L 29/08* (2006.01)

(52) U.S. Cl.
CPC ........ *H04L 63/0876* (2013.01); *H04L 63/102* (2013.01); *H04L 67/146* (2013.01)

(58) Field of Classification Search
CPC .. H04L 63/0876; H04L 63/102; H04L 67/146
See application file for complete search history.

(56) References Cited

U.S. PATENT DOCUMENTS

| | | | |
|---|---|---|---|
| 9,736,140 B1* | 8/2017 | Wu ......................... | H04L 63/08 |
| 2010/0250741 A1* | 9/2010 | Hansaki .................. | H04L 67/16 |
| | | | 709/224 |
| 2011/0247078 A1 | 10/2011 | Fukushima | |
| 2014/0181943 A1* | 6/2014 | Arashin ................ | H04W 12/50 |
| | | | 726/7 |

FOREIGN PATENT DOCUMENTS

| | | | |
|---|---|---|---|
| CN | 103167581 A | | 6/2013 |
| CN | 105791560 A | | 7/2016 |
| CN | 106162649 A | | 11/2016 |
| JP | 2008-193546 A | | 8/2008 |
| JP | 2011-215952 A | | 10/2011 |
| JP | 2015161958 A | * | 9/2015 |

\* cited by examiner

*Primary Examiner* — Arvin Eskandarnia
(74) *Attorney, Agent, or Firm* — Dinsmore & Shohl LLP

(57) ABSTRACT

A communication device includes: a storage unit configured to store identification information of a network on which an application operates, as first identification information; a connection unit configured to connect to the network; an acquisition unit configured to acquire identification information of a connecting target network via the connection unit, as second identification information; and a connection controller configured not to permit a connection of the application to the network corresponding to the second identification information in a case where the first identification information is different from the second identification information.

6 Claims, 4 Drawing Sheets

COMMUNICATION DEVICE, METHOD OF CONTROLLING COMMUNICATION DEVICE, AND COMPUTER-READABLE NON-TRANSITORY STORAGE MEDIUM STORING PROGRAM

CROSS-REFERENCE TO RELATED APPLICATION

This application claims priority to Japanese Patent Application No. 2017-249591 filed on Dec. 26, 2017, incorporated herein by reference in its entirety.

BACKGROUND

1. Technical Field

The disclosure relates to a communication device, a method of controlling a communication device, and a computer-readable non-transitory storage medium storing a program.

2. Description of Related Art

In the related art, in order to improve security of an information terminal, a function of making the information terminal usable solely in a case of being connected to a specific network and making the information terminal unusable in a case of being connected to another network is known. For example, Japanese Unexamined Patent Application Publication No. 2011-215952 (JP 2011-215952 A) discloses the following means. When an information processing device is connected to a new network, the means makes the information processing device unusable by locking the information processing device in a case where the newly connected network is different from a previously registered network.

SUMMARY

For example, in a portable terminal or the like, an application for which there is a need to restrict a connecting destination of a network in order to improve the security, and an application for which the restriction is not needed, may be mixed. In the case as described above, when the lock function is applied, in a case where a terminal is connected to a network other than the previously registered network, since an entire terminal is locked and use of all applications is restricted, user's convenience may be further reduced.

The disclosure provides a communication device, a method of controlling a communication device, and a computer-readable non-transitory storage medium storing a program that can restrict a connection of a specific application to a network while user's convenience is ensured.

A first aspect of the disclosure relates to a communication device. The communication device includes a storage unit, a connection unit, an acquisition unit, and a connection controller. The storage unit is configured to store identification information of a network on which an application operates, as first identification information. The connection unit is configured to connect to the network. The acquisition unit is configured to acquire identification information of a connecting target network via the connection unit, as second identification information. The connection controller is configured not to permit a connection of the application to the network corresponding to the second identification information in a case where the first identification information is different from the second identification information.

The communication device according to the first aspect of the disclosure may further include a specification unit configured to specify an application that requests the connection to the network. The storage unit may be configured to store the first identification information in association with application identification information for identifying the application. The connection controller may be configured not to permit the connection of the application specified by the specification unit to the network corresponding to the second identification information when conditions i) and ii) are both satisfied, i) the application identification information corresponding to the application specified by the specification unit is stored in the storage unit and ii) the first identification information stored in association with the application identification information is different from the second identification information acquired by the acquisition unit.

In the communication device according to the first aspect of the disclosure, the connection controller may be configured to permit the connection of the application to the network corresponding to the second identification information in a case where the first identification information matches the second identification information.

A second aspect of the disclosure relates to a method of controlling a communication device. The communication device includes a storage unit configured to store first identification information which is identification information of a network on which an application operates. The method includes acquiring identification information of a connecting target network as second identification information, and not permitting a connection of the application to the network corresponding to the second identification information in a case where the first identification information stored in the storage unit is different from the acquired second identification information.

In the method according to the second aspect of the disclosure, the storage unit may be configured to further store application identification information for identifying the application in association with the first identification information. The method may further include specifying an application that requests the connection to the network, and not permitting the connection of the specified application to the network corresponding to the second identification information when conditions i) and ii) are both satisfied, i) the application identification information corresponding to the specified application is stored and ii) the first identification information stored in association with the application identification information is different from the acquired second identification information.

A third aspect of the disclosure relates to a computer-readable non-transitory storage medium storing a program. The program causes a computer to function as a storage unit configured to store identification information of a network on which an application operates, as first identification information, a connection unit configured to connect to the network, an acquisition unit configured to acquire identification information of a connecting target network via the connection unit, as second identification information, and a connection controller configured not to permit a connection of the application to the network corresponding to the second identification information in a case where the first identification information is different from the second identification information.

According to the aspects of the disclosure, it is possible to provide a communication device, a method of controlling a communication device, and a computer-readable non-transitory storage medium storing a program that can restrict the connection of the specific application to the network while user's convenience is ensured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
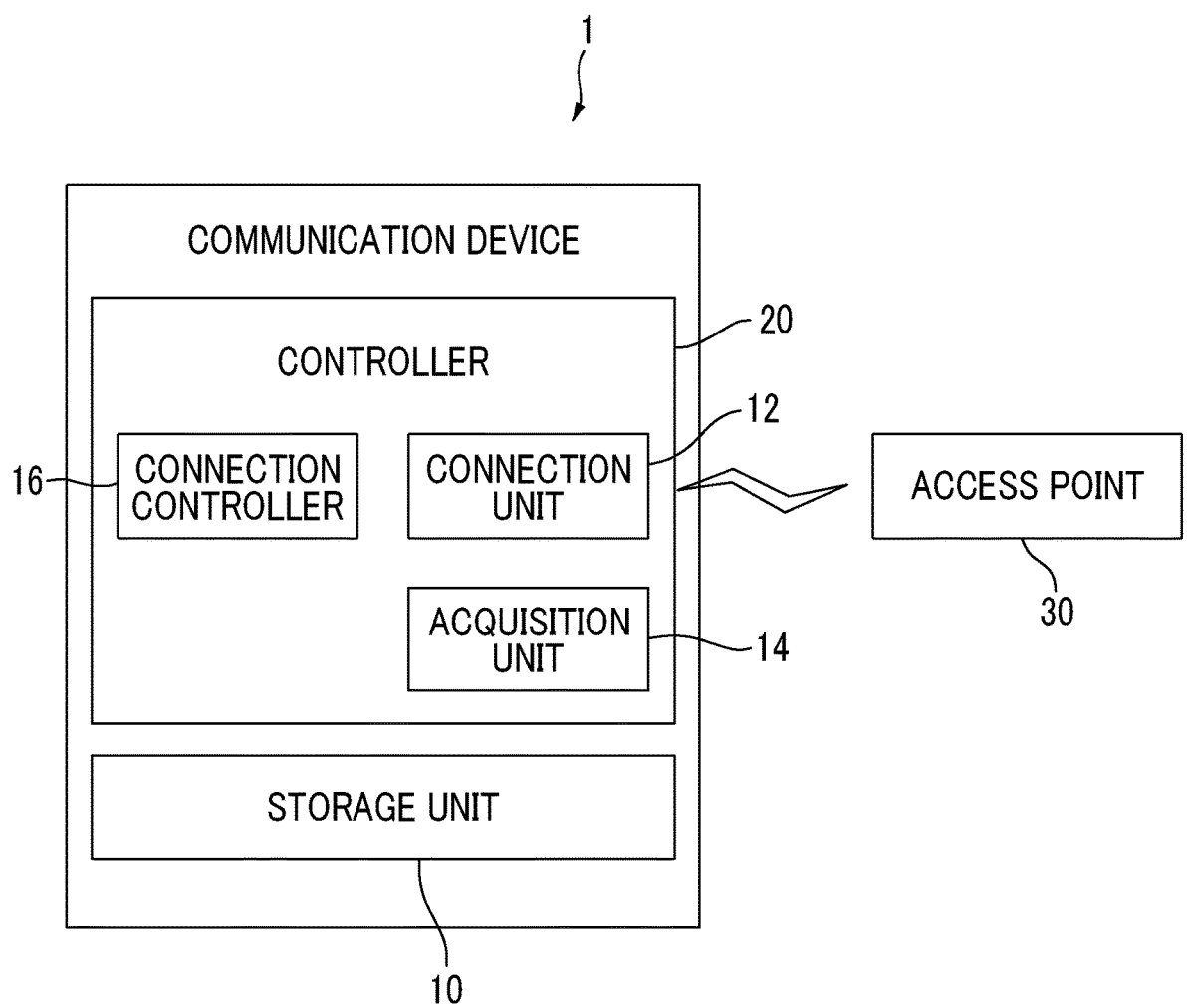
FIG. 1 is a diagram illustrating a configuration of a communication device according to an embodiment of the disclosure.

An embodiment of the disclosure is described with reference to the accompanying drawings. In the respective drawings, those denoted by the same reference numerals have the same or similar configuration.

FIG. 1 is a diagram illustrating a configuration of a communication device according to the embodiment of the disclosure. A communication device 1 illustrated in FIG. 1 is a mobile communication device such as a mobile phone, and has a plurality of applications installed therein. The applications include an application for which there is a need to improve security and a need to restrict a connecting target network (hereinafter referred to as "application with restriction"), and an application for which there is less need to improve the security and there is no need to restrict the connecting target network (hereinafter referred to as "application without restriction").

Specific examples of an application with restriction include an electronic lock application that controls locking and unlocking of an entrance door of a home, for example, by communicating with an interphone master unit of the home. For example, it is desirable for the electronic lock application to operate solely in a case where the communication device 1 is connected to Wi-Fi at the home, and to stop an operation in a case where the communication device 1 is connected to the Wi-Fi at a transport hub, a public facility, or a workplace other than the home, which is to further suppress an unnecessary transmission of highly confidential information. Specific examples of an application without restriction include an application such as a typical web browser. For the application without restriction, it is desirable to operate by a connection to any network at a public space or the like. In the embodiment of the disclosure, it is possible to restrict the network connection for each application as described above. Hereinafter, a specific configuration of the communication device 1 will be described with the electronic lock application as an example.

As illustrated in FIG. 1, as a functional configuration, the communication device 1 includes, for example, a storage unit 10 that stores identification information of a network and a controller 20 that realizes various functions. As the functional configuration, the controller 20 includes, for example, a connection unit 12 that connects to the network, an acquisition unit 14 that acquires identification information of the connected network, and a connection controller 16 that controls the connection of the application with restriction by a collation of the acquired identification information.

The storage unit 10 is a storage device such as a memory, and stores the identification information of the network on which the application with restriction operates (first identification information). Specifically, since it is desirable that the electronic lock application which controls the locking and unlocking of a door of the home is operable solely at the time of a Wi-Fi connection at the home, a service set identifier (SSID) of the Wi-Fi at the home is stored in the storage unit 10. The SSID is an identifier of an access point that provides a wireless local area network (LAN), and in a case where a plurality of access points provides the same network, the access points share the same SSID. In other words, the SSID is an example of the identification information for identifying the network. The identification information for identifying the network is not limited to the SSID. The wireless LAN to which the communication device 1 is connected is not limited to the Wi-Fi.

A registration of the SSID of the network on which the electronic lock application operates can be performed, for example, by the following procedures. The communication device 1 is connected to a registering target network (for example, the Wi-Fi at home) to activate the electronic lock application. The interphone master unit of the home which is a manipulation target is registered, the SSID of the connected network is acquired, and the acquired SSID is stored in the storage unit 10. For example, synchronization processing between the electronic lock application and the master unit is performed, authentication information is mutually exchanged to be stored, and thus a registration of the master unit is performed.

The connection unit 12 is, for example, a wireless communication module. In a case where the communication device 1 is positioned in a network area provided by a certain access point 30, the connection unit 12 automatically detects the access point 30 and connects to the network.

The acquisition unit 14 senses that the communication device 1 is connected to a new network via the connection unit 12, and acquires an SSID (second identification information) of the newly connected network.

The connection controller 16 collates the SSID stored in the storage unit 10 with the SSID acquired by the acquisition unit 14. In a case where the SSID stored in the storage unit 10 matches the SSID acquired by the acquisition unit 14 as a result of the collation, the connection controller 16 permits the connection of the electronic lock application to the network, and in a case where the SSIDs are different from each other, the connection controller 16 does not permit the connection of the electronic lock application to the network.

The above-described functions included in the controller 20 are realized, for example, by a processor (not illustrated) executing a predetermined program stored in the storage unit 10.

Figure 2:
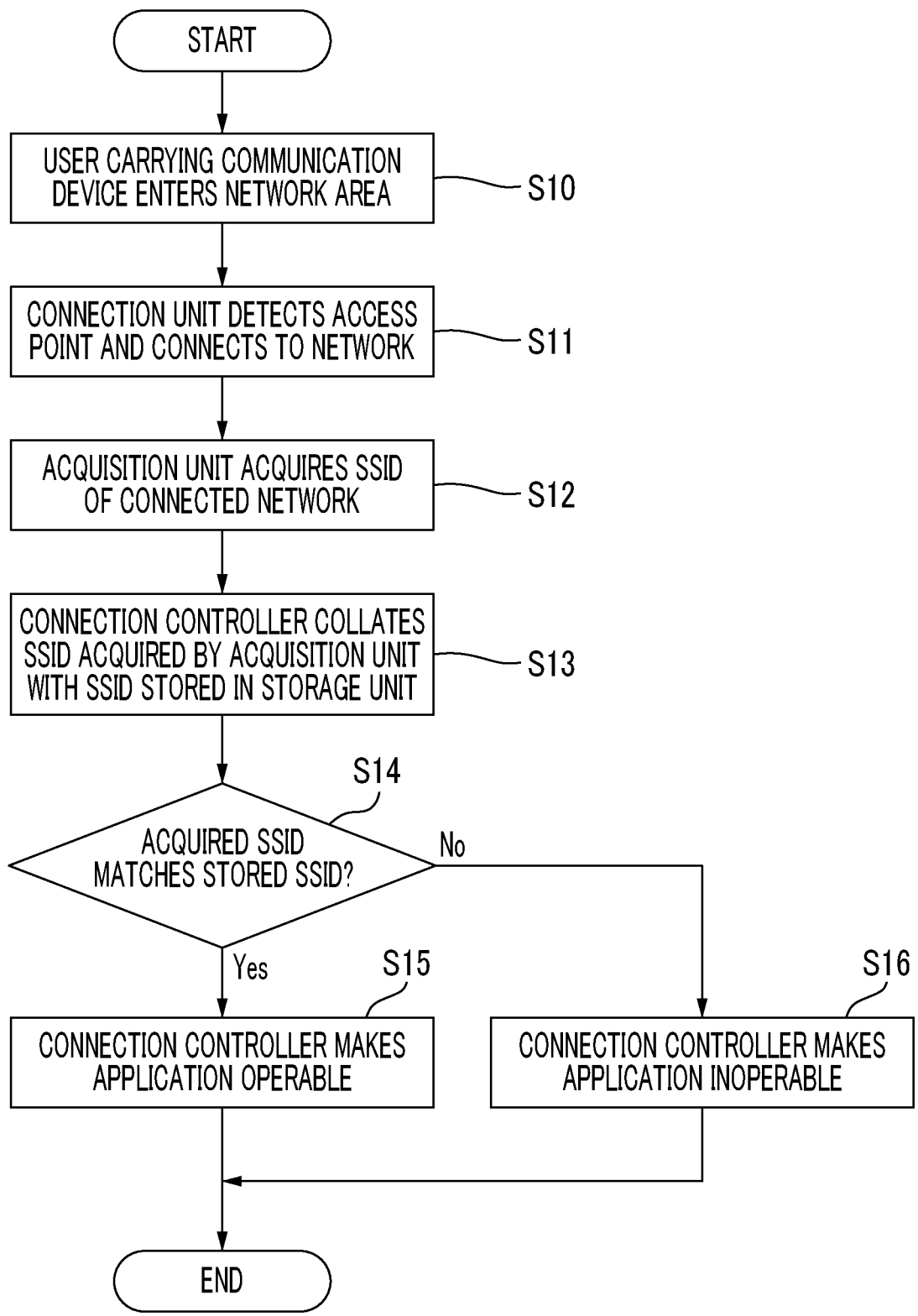
FIG. 2 is a flowchart illustrating a case where the communication device according to the embodiment of the disclosure is connected to a new network.

FIG. 2 is a flowchart illustrating a case where the communication device 1 is connected to a new network.

A user carrying the communication device 1 enters a network area of the certain access point (S10). The connection unit 12 of the communication device 1 detects the access point 30 and automatically connects to the network provided by the access point 30 (S11). The acquisition unit 14 senses that the communication device 1 is connected to the new network, and acquires the SSID of the newly connected network (S12). The connection controller 16 collates the SSID acquired by the acquisition unit 14 with the SSID stored in the storage unit 10 (S13).

When the acquired SSID matches the stored SSID as a result of the collation (S14: Yes), the connection controller 16 permits the connection of the electronic lock application to the network and makes the electronic lock application operable (S15). Specifically, the electronic lock application searches for the interphone master unit and mutual authentication is performed based on the authentication information stored at the time of registering the interphone master unit. In a case where the mutual authentication is successfully performed, the electronic lock application transmits a packet for requesting unlocking of an electronic lock to the interphone master unit. The interphone master unit unlocks the electronic lock based on the transmitted packet and locks the electronic lock again under a predetermined condition.

A locking condition of the electronic lock may be, for example, a case where the door is opened and then closed, a case where a certain time elapsed after the door is opened, a case where a packet for requesting locking of the electronic lock is transmitted from the communication device 1, a case where the user performs a locking manipulation of the interphone master unit, or the like. In a case where a dynamic host configuration protocol (DHCP) is applied to the network to which the interphone master unit is connected and an internet protocol address (IP address) of the interphone master unit is dynamically allocated, the electronic lock application may transmit a packet to find the interphone master unit before the packet for requesting the unlocking of the electronic lock is transmitted.

In a case where the acquired SSID is different from the stored SSID as a result of the collation (S14: No), the connection controller 16 does not permit the connection of the electronic lock application to the network and makes the electronic lock application inoperable (S16). Specifically, the connection controller 16 stops processing of the electronic lock application and puts the electronic lock application in a sleep state until the connection to the new network is sensed.

According to the embodiment of the disclosure, the communication device 1 achieves the following effects. When the connection of the electronic lock application is not restricted and the electronic lock application operates by the connection to any network, a highly confidential packet such as the authentication information for the interphone master unit is transmitted via the connection to any network, which is not desirable from the viewpoint of the security. Outside a vicinity of the home as well, a retry operation of searching for the interphone master unit can be frequently repeated, which is a factor of consuming power more than needed. As disclosed in JP 2011-215952 A, when the connection restriction to the network reaches an entire communication device, power consumption is further suppressed, but even the application without restriction is also unusable and convenience is further reduced.

With the communication device 1, the connection for the application with restriction is restricted by collating the SSIDs, and the connection for the application without restriction is not restricted to any network. Accordingly, with the communication device 1, it is possible to restrict the connection of a specific application to the network while user's convenience is ensured. Therefore, in the communication device 1, since the transmission of unnecessary packets is further suppressed, the security is further improved. In the communication device 1, since an unnecessary retry operation is avoided, the power consumption is further suppressed. With the communication device 1, since it is possible to employ the configuration in which the electronic lock is automatically unlocked solely by a behavior of the user approaching the home entrance, the convenience is further improved as compared with the configuration that needs an unlocking manipulation.

As another example of the application with restriction described above, a breaker control application that controls a breaker of a charging facility of an electric vehicle will be described.

In order to charge the electric vehicle at the home, there is a need to install a dedicated charging facility (outlet). The outlet is installed outdoors in many cases, and is susceptible to theft of electricity. In order to reduce the theft of electricity, a cover or the like having a physical key has been proposed, but the cover can be easily broken depending on a material of the cover, and the effect of reducing the theft of electricity is relatively small. In the following description, a configuration is assumed that the user manipulates the communication device 1 to access a home server of the home, and the home server controls a breaker of the home to reduce the theft of electricity.

Specifically, it is assumed that the home server can individually switch an on-state and an off-state of the breaker of each electrical system at the home including the charging facility, for example. The user accesses the home server via the breaker control application installed in the communication device 1 to switch the on-state and the off-state of the breaker of the charging facility. The communication device 1 may be, for example, a communication apparatus mounted on the vehicle, or a mobile terminal carried by the user.

The registration of the SSID of the network on which the breaker control application operates can be performed in the same manner as the electronic lock application described above. In other words, first, the communication device 1 is connected to the registering target network (for example, Wi-Fi at home) to activate the breaker control application. Next, the home server of the home that is the manipulation target is registered, the SSID of the connected network is acquired, and the acquired SSID is stored in the storage unit 10. For example, synchronization processing between the breaker control application and the home server is performed, authentication information is mutually exchanged to be stored, and thus a registration of the home server is performed.

The manipulation procedure of the breaker control application will be described with reference to FIG. 2. Since the procedures from step S10 to step S13 illustrated in FIG. 2 is the same as the electronic lock application described above, a detailed description thereof will be omitted.

In a case where the acquired SSID matches the stored SSID (S14: Yes) as a result of the collation in step S13, the connection controller 16 permits the connection of the breaker control application to the network and makes the breaker control application operable (S15). Specifically, the breaker control application transmits a packet for searching for the home server, and mutual authentication is performed based on the authentication information stored at the time of registering the home server. When the mutual authentication is successfully performed, the breaker control application transmits a packet for requesting the on-state of the breaker to the home server. The home server makes the breaker of the charging facility be in the on-state based on the transmitted packet and makes the breaker of the charging facility be in the off-state again under a predetermined condition.

A condition for making the breaker again be in the off-state may be, for example, a case where the certain time elapsed after the breaker is caused to be in the on-state, a case where a designated time is reached, a case where a packet for requesting the off-state of the breaker is transmitted from the communication device 1, a case where the user performs an off-manipulation on the home server, or the like.

In a case where the acquired SSID is different from the stored SSID as a result of the collation (S14: No), the connection controller 16 does not permit the connection of the breaker control application to the network and makes the breaker control application inoperable (S16).

For the application as described above as well, by applying the configuration of the communication device 1, it is possible to restrict the connection of the specific application to the network while the user's convenience is ensured. Therefore, similar to the above-described electronic lock application, in the communication device 1, since the unnecessary transmission of the highly confidential packets is further suppressed, the security is further improved. With the communication device 1, it is possible to further improve a reduction effect of the theft of electricity as compared with the configuration in which the charging facility is provided with the physical key. With the communication device 1, since it is possible to employ the configuration in which the charging facility is automatically switched to a chargeable state solely by an operation of the vehicle or the behavior of the user approaching the charging facility, the convenience is further improved as compared with the configuration that needs the switching manipulation.

Figure 3:
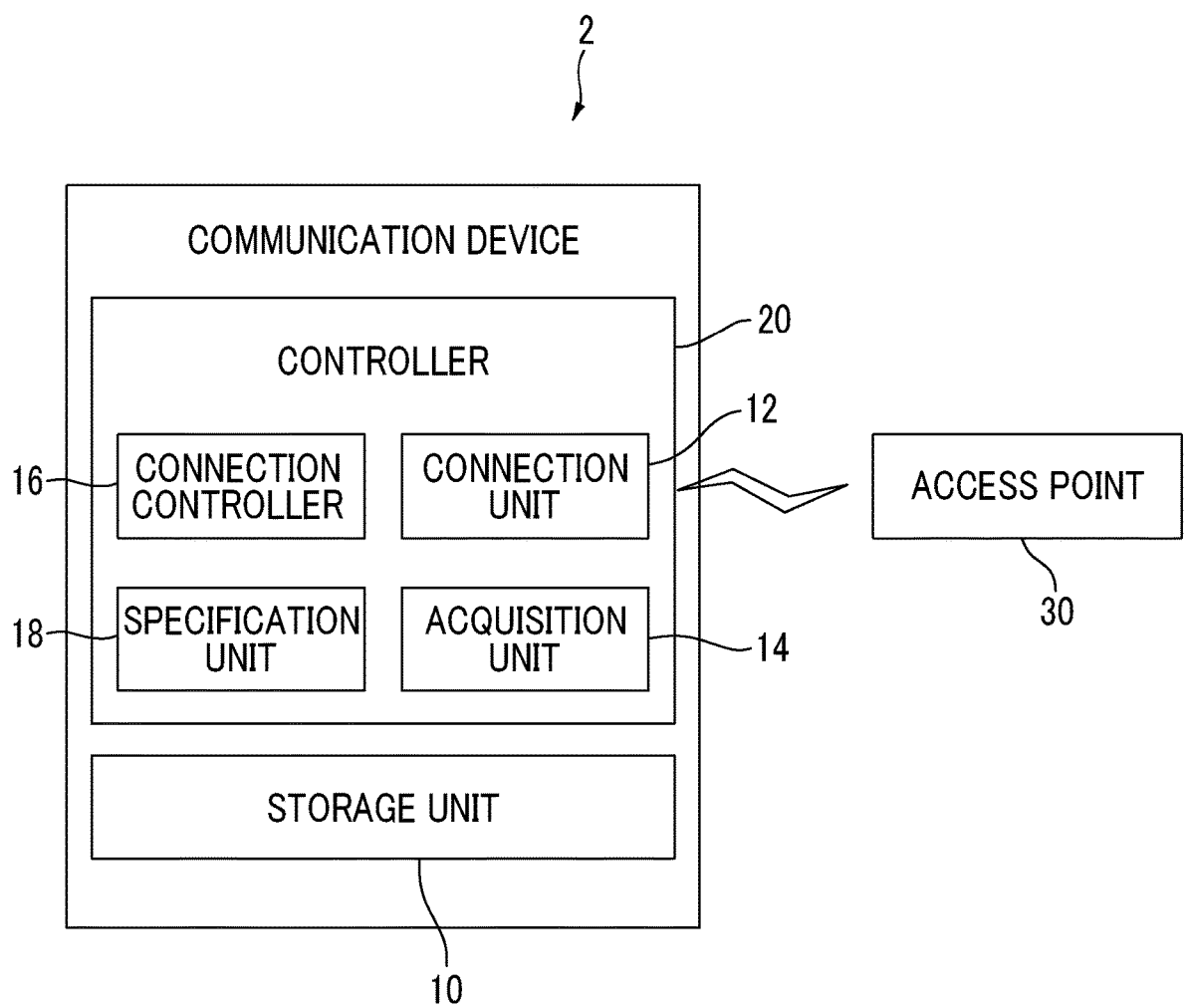
FIG. 3 is a diagram illustrating a configuration of a communication device according to a modification example of the embodiment of the disclosure.
Figure 4:
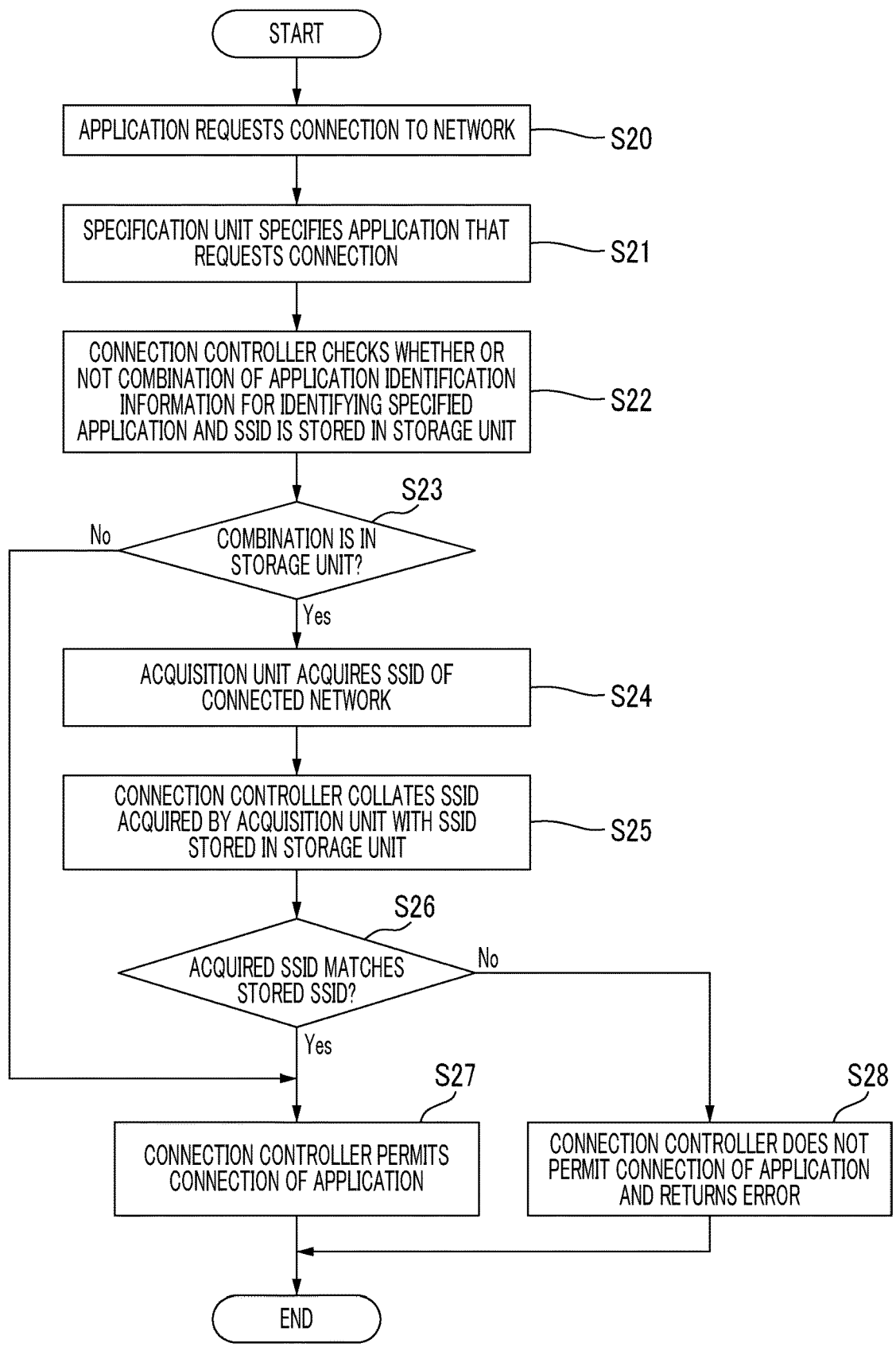
FIG. 4 is a flowchart illustrating a case where a certain application requests a connection to a network in the communication device according to the modification example of the embodiment of the disclosure.

In the embodiment of the disclosure, the SSID of the network is stored by the application. Controlling the storage of the SSID of the network is not limited to a case of using the application, and for example, an operating system (OS) of the communication device 1, and middleware may be used. With reference to FIGS. 3 and 4, as a modification example of the communication device, a configuration in which the SSID is stored by the OS will be described. The same elements as those of the above-described communication device 1 are denoted by the same reference numerals, and a description thereof will be omitted.

FIG. 3 is a diagram illustrating a configuration of a communication device according to the modification example of the embodiment of the disclosure. A communication device 2 illustrated in FIG. 3 further includes a specification unit 18 as compared with the communication device 1.

In a case where a certain application requests the connection to the network, the specification unit 18 specifies the application that makes the request.

In the communication device 2, the SSIDs of the network to which the connection is permitted for one or more applications with restriction are respectively associated with pieces of application identification information for identifying the applications with restriction, and are stored in the storage unit 10 by the OS. In the storage unit 10, for example, a combination of the application identification information for identifying each application with restriction and the SSID of the network to which the connection is permitted for the application with restriction is stored as a table, for example. Accordingly, in a case where the certain application requests the connection to the network, the non-permitted connection to the network can be blocked by referring to the table stored in the storage unit 10. The procedure for registering the SSID by which the connection is permitted may be the same as the procedure described above.

FIG. 4 is a flowchart illustrating a case where the certain application requests the connection to the network, in the communication device according to the modification example of the embodiment of the disclosure. An assumption is made that the combination of the application identification information and the SSID is stored in the storage unit 10 before the flow is started.

In a state in which the communication device is connected to a certain network, the certain application requests the connection to the network (S20). The specification unit 18 specifies the application that requests the connection (S21). The connection controller 16 checks whether or not the combination of the application identification information for identifying the specified application and the SSID is stored in the storage unit 10 (S22). As a result of the checking, in a case where the combination is not in the storage unit 10 (S23: No), since the specified application is the application without restriction, the connection controller 16 permits the connection requested by the application (S27).

As a result of the checking, in a case where the combination of the application identification information and the SSID is in the storage unit 10 (S23: Yes), since the specified application is the application with restriction, processing proceeds to a step of the checking whether or not the connected network is the network to which the connection is permitted. The acquisition unit 14 acquires the SSID of the connected network (S24). The connection controller 16 collates the SSID acquired by the acquisition unit 14 with the SSID stored in the storage unit 10 in association with the application identification information (S25).

In a case where the acquired SSID matches the stored SSID (S26: Yes) as a result of the collation, the connection controller 16 permits the connection requested by the application (S27). In a case where the acquired SSID is different from the stored SSID (S26: No), the connection controller 16 does not permit the connection requested by the application and returns an error (S28).

According to the embodiment of the disclosure as well, the communication device 1 can restrict the connection of the specific application to the network while the user's convenience is ensured.

The disclosure is not limited to the embodiment of the disclosure, and can be implemented in various forms within the scope without departing from the spirit of the disclosure. Therefore, the embodiment of the disclosure is merely an example in all respects, and is not to be construed as limiting.

For example, the application to which the disclosure is applied is not limited to the above-mentioned example, and the disclosure can be applied to various other applications. Specifically, the disclosure may be applied to controls of other facilities such as a garage shutter of a home, locking and unlocking of a vehicle door, or starting of an engine. The disclosure may be applied for a purpose of enabling a machine tool at a factory to be manipulated solely in a case where the user is nearby or a printer at a workplace to be used solely in a case where the user is nearby or the like, in order to reduce another manipulator's manipulations thereof. The disclosure may be applied for the purpose of distributing coupons or points solely to visitors of stores or notifying solely visitors of facilities such as a transport hub or an amusement park of real-time guidance information.

What is claimed is:

1. A communication device configured to:
 store identification information of a first network on which an application is permitted to operate, as first identification information;
 connect to a second network;
 acquire identification information of the second network, as second identification information; and
 in a case where the first identification information is different from the second identification information, put the application in a sleep state until a connection to a new network is sensed.

2. The communication device according to claim 1, further configured to:
 specify an application that requests operation on the second network;
  store the first identification information in association with application identification information for identifying the application; and
  not permit operation of the specified application when conditions i) and ii) are both satisfied,
 i) the application identification information corresponding to the specified application is stored in the storage unit, and
 ii) the first identification information stored in association with the application identification information is different from the second identification information.

3. The communication device according to claim 1, further configured to permit operation of the application in a case where the first identification information matches the second identification information.

4. A method of controlling a communication device including a storage unit configured to store first identification information which is identification information of a first network on which an application is permitted to operate, the method comprising:
 connecting to a second network;
 acquiring identification information of the second network as second identification information; and
 in a case where the first identification information stored in the storage unit is different from the acquired second identification information, putting the application in a sleep state until a connection to a new network is sensed.

5. The method according to claim 4, wherein:
 the storage unit is configured to further store application identification information for identifying the application in association with the first identification information; and
 the method further includes
  specifying an application that requests operation on the second network, and
  not permitting operation of the specified application on the second network when conditions i) and ii) are both satisfied,
 i) the application identification information corresponding to the specified application is stored, and
 ii) the first identification information stored in association with the application identification information is different from the acquired second identification information.

6. A computer-readable non-transitory storage medium storing a program causing a computer to function as
 a storage unit configured to store identification information of a first network on which an application is permitted to operate, as first identification information,
 a connection unit configured to connect to a second network,
 an acquisition unit configured to acquire identification information of a the second network via the connection unit, as second identification information, and
 a connection controller configured to put the application in a sleep state until a connection to a new network is sensed in a case where the first identification information is different from the second identification information.

* * * * *